US010415453B2

United States Patent
Hattar et al.

(10) Patent No.: US 10,415,453 B2
(45) Date of Patent: Sep. 17, 2019

(54) ACTIVE REGENERATION METHOD FOR A GASOLINE PARTICULATE FILTER OF AN INTERNAL COMBUSTION ENGINE

(71) Applicant: GM GLOBAL TECHNOLOGY OPERATIONS LLC, Detroit, MI (US)

(72) Inventors: Rafat F. Hattar, Royal Oak, MI (US); Alexander Michel, Ruesselsheim (DE); Simon Schiesser, Ruesselsheim (DE); Nils Oth, Ruesselsheim (DE); Markus Kraft, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/689,471

(22) Filed: Aug. 29, 2017

(65) Prior Publication Data

US 2019/0063295 A1 Feb. 28, 2019

(51) Int. Cl.
*F01N 9/00* (2006.01)
*F01N 3/02* (2006.01)
*F01N 3/023* (2006.01)
*F01N 3/025* (2006.01)
*F02D 41/12* (2006.01)
*F01N 3/035* (2006.01)

(52) U.S. Cl.
CPC .............. *F01N 9/002* (2013.01); *F01N 3/023* (2013.01); *F01N 3/025* (2013.01); *F01N 3/0256* (2013.01); *F01N 3/035* (2013.01); *F02D 41/123* (2013.01); *F01N 2900/1602* (2013.01); *F01N 2900/1606* (2013.01)

(58) Field of Classification Search
CPC .......... F01N 3/023; F01N 3/025; F01N 9/002; F01N 2900/1602; F01N 2900/1606; F02D 13/06; F02D 17/02; F02D 41/123; F02D 2041/0012
See application file for complete search history.

(56) References Cited

U.S. PATENT DOCUMENTS

| 2010/0205942 | A1* | 8/2010 | Fujiwara ............... F02D 41/029 60/285 |
| 2018/0216552 | A1* | 8/2018 | Yokoi ................. F02N 11/0829 |
| 2019/0032585 | A1* | 1/2019 | Kelly ................. B01D 46/0063 |

FOREIGN PATENT DOCUMENTS

| JP | 2008031890 A | * | 2/2008 |
| JP | 2017089538 A | * | 5/2017 |

* cited by examiner

*Primary Examiner* — Audrey K Bradley

(57) ABSTRACT

An active regeneration method for a gasoline particulate filter includes determining if a particulate filter soot load level is greater than a predetermined soot load level threshold and, if so, determining if the particulate filter's temperature is greater than a predetermined burn off temperature threshold. A particulate filter heating phase is initiated when the particulate filter's temperature is not greater than a predetermined burn off temperature threshold and a soot burning phase is started when the particulate filter's temperature is greater than a predetermined burn off temperature threshold.

9 Claims, 2 Drawing Sheets

Figure 1:
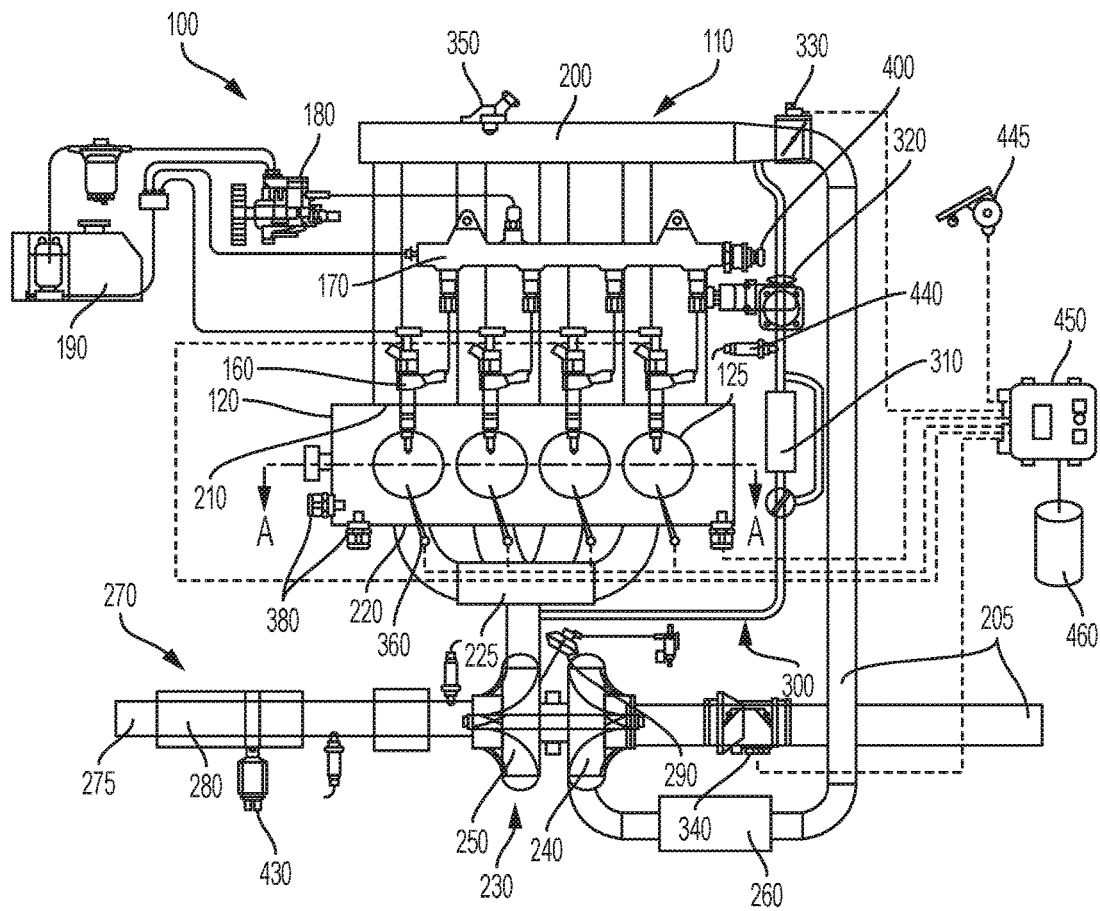

ACTIVE REGENERATION METHOD FOR A GASOLINE PARTICULATE FILTER OF AN INTERNAL COMBUSTION ENGINE

FIELD

The present disclosure generally relates to an internal combustion engine, for example an internal combustion engine of a motor vehicle, which is provided with a particulate filter. In greater details, the present disclosure relates to an active regeneration method for a gasoline particulate filter.

BACKGROUND

It is known that many internal combustion engines, including spark-ignition engines (e.g. gasoline engines), are commonly provided with a particulate filter for trapping most of the particulate matter (soot) produced by the engine in order to reduce the polluting emissions.

The soot collected inside the particulate filter is removed from time to time by means of a soot combustion process, generally referred to as the regeneration process, which takes place when the temperature of the particulate filter is above a certain value (e.g. 500° C.) and enough oxygen is present in the exhaust system.

On engines with homogeneous stoichiometric combustion, such as gasoline engines, the regeneration processes can mainly occur during fuel cut off phases, when no fuel is supplied into the engine cylinders and large amounts of oxygen are pumped towards the particulate filter by the engine pistons. Under these conditions, if the temperature of the particulate filter reaches the prescribed value, the combustion of the collected soot occurs spontaneously (passive regeneration).

However, during short driving cycles or driving cycles with low load operations, passive regeneration could be impossible either because the temperature of the particulate filter is unable to reach the triggering value, or because no fuel cut off phases are performed. To avoid overloading of the particulate filter under these scenarios, an active regeneration process is needed when the amount of soot collected inside the particulate filter exceeds a predetermined threshold value thereof.

SUMMARY

One or more exemplary embodiments address the above issue by providing an internal combustion engine, for example an internal combustion engine of a motor vehicle, which is provided with a particulate filter. In greater details, the present disclosure relates to an active regeneration method for a gasoline particulate filter.

According to aspects of an exemplary embodiment, an active regeneration method for a gasoline particulate filter includes determining if a particulate filter soot load level is greater than a predetermined soot load level threshold. Another aspect of the exemplary embodiment includes determining if the particulate filter's temperature is greater than a predetermined burn off temperature threshold when the particulate filter soot load level is greater than the predetermined soot load level threshold. And another includes initiating soot burning phase actions when the particulate filter's temperature is greater than a predetermined burn off temperature threshold and when the particulate filter soot load level is greater than the predetermined soot load level threshold.

A further aspect in accordance with the exemplary embodiment includes initiating heat up phase actions when the particulate filter's temperature is not greater than a predetermined burn off temperature threshold. And another aspect wherein the heat up phase further comprises retarding spark to increase exhaust gas temperature. Yet another aspect wherein the heat up phase further comprises introducing a inhomogeneous mixture into the particulate filter using injection splitting. And still another wherein the inhomogeneous mixture is oxygen and rich exhaust gas.

Still further aspects in accordance with the exemplary embodiment include inhibiting deceleration fuel cut-off/engine auto stop to increase exhaust gas temperature. And another aspect includes disabling cylinders to reduce air flow through the particulate filter. And still another aspect wherein the soot burning phase further comprises enabling deceleration fuel cutoff. And yet another aspect wherein the soot burning phase further comprises commanding lean mixture fuel injection when deceleration fuel cut off is inactive.

DRAWINGS

The drawings described herein are for illustration purposes only and are not intended to limit the scope of the present disclosure in any way.

Figure 2:
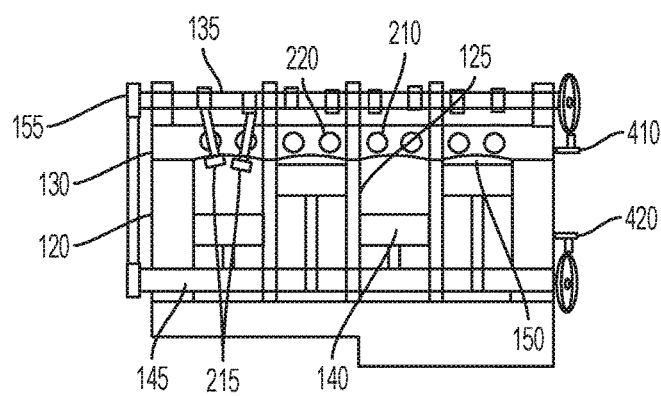
Figure 3:
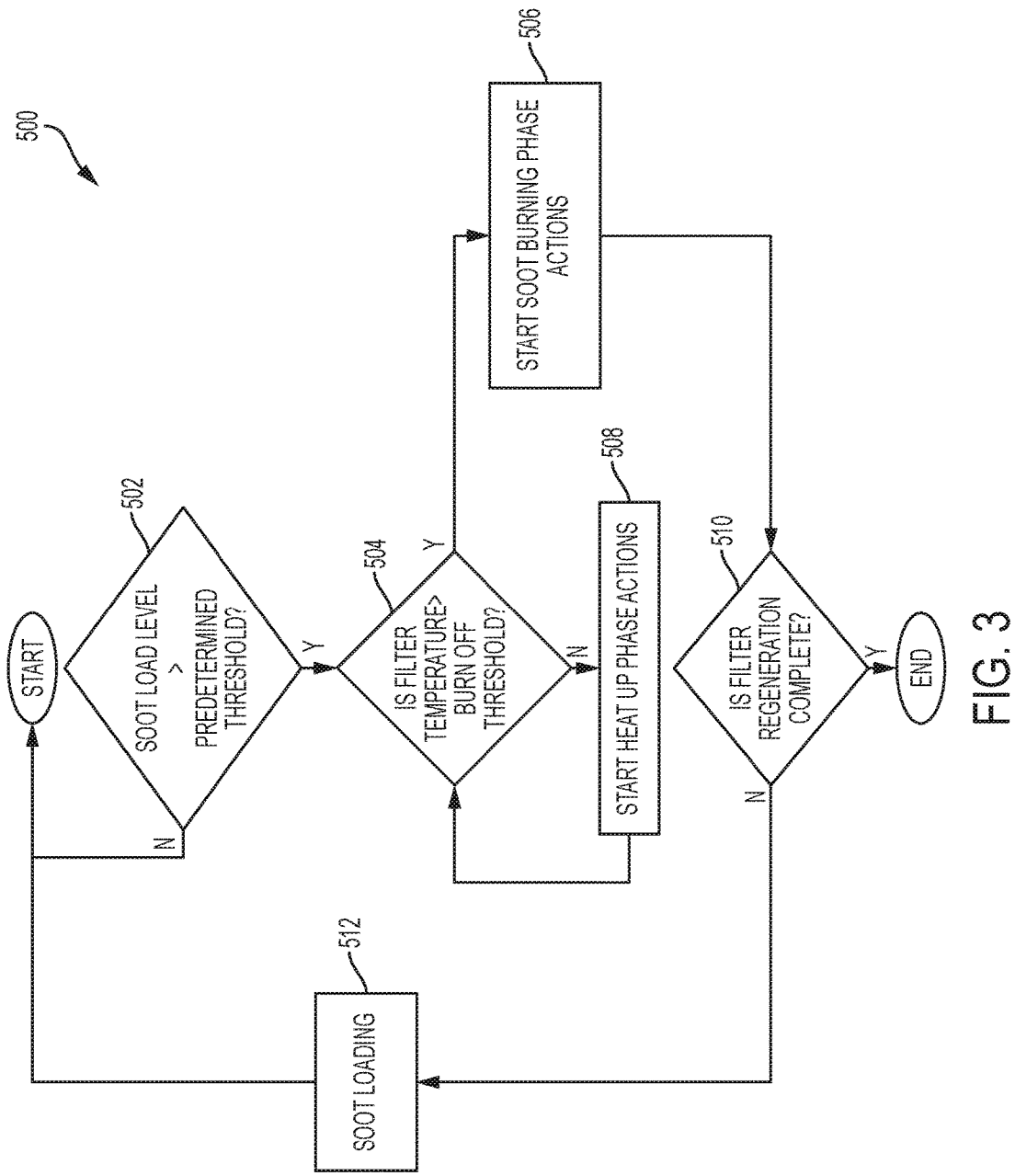

FIG. 1 schematically shows an automotive system in accordance with aspects of an exemplary embodiment;

FIG. 2 shows an internal combustion engine of the automotive system according to the section A-A of FIG. 1 in accordance with aspects of the exemplary embodiment; and FIG. 3 is an algorithm of an active regeneration method for a gasoline particulate filter (GPF) in accordance with aspects of the exemplary embodiment.

DETAILED DESCRIPTION

The following description is merely exemplary in nature and is not intended to limit the present disclosure, application, or uses.

Some embodiments may include an automotive system 100, as shown in FIGS. 1 and 2 that includes an internal combustion engine (ICE) 110. The ICE 110 may be a gasoline engine, for example a gasoline direct injection (GDI) engine. The ICE 110 has an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gasses to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air.

The turbine 250 rotates by receiving exhaust gasses from an exhaust manifold 225 that directs exhaust gasses from the exhaust ports 220 and through a series of vanes prior to expansion through the turbine 250. This example shows a variable geometry turbine (VGT) with a VGT actuator 290 arranged to move the vanes to alter the flow of the exhaust gasses through the turbine 250. In other embodiments, the turbocharger 230 may be fixed geometry and/or include a waste gate. The exhaust gasses exit the turbine 250 and are directed into an exhaust system 270. The exhaust system 270 may include an exhaust pipe 275 having one or more exhaust aftertreatment devices.

The aftertreatment devices may be any device configured to change the composition of the exhaust gasses. The aftertreatment devices include a particulate filter 280, for example a gasoline particulate filter, configured to trap soot and other particulate matters produced by the fuel combustion and transported by the exhaust gasses. The aftertreatment devices may further include other devices such as, but not limited to, catalytic converters (two and three way), oxidation catalysts, lean NOx traps, hydrocarbon adsorbers and selective catalytic reduction (SCR) systems.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gasses in the EGR system 300. An EGR valve 320 regulates a flow of exhaust gasses in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, a particulate filter temperature sensors 430, other exhaust gas pressure and temperature sensors, an EGR temperature sensor 440, and an accelerator pedal position sensor 445.

Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a wireless connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle. During normal operation of the ICE 110, the combustion of the air and fuel mixture within the engine cylinder 125 generates a certain amount of soot, which is progressively trapped and collected inside the particulate filter 280.

Any time the driver releases the accelerator pedal, the ECU 450 is generally configured to prevent the fuel from being supplied into the engine cylinders 125, for example by keeping all the fuel injectors 160 closed. In this way, the ICE 110 undergoes a so-called fuel cut off phase, during which the reciprocating motion of the pistons 140 in the corresponding cylinders 125 has the only effect of pumping fresh air and thus oxygen from the intake manifold 200 towards the exhaust system 270.

While the ICE 100 undergoes a fuel cut off phase, if the temperature of the particulate filter 280 is high enough (e.g. larger than 500° C.), the large amount oxygen coming from the intake manifold 200 has the effect of triggering a spontaneous combustion of the soot trapped inside the particulate filter 280, thereby performing a so-called passive regeneration. However, if the conditions for the passive regeneration are not met, the soot continues to accumulate inside the particulate filter 280.

To deal with this scenario, when the amount of trapped soot reaches a predetermined maximum value thereof, the ECU 450 is generally configured to activate a so-called active regeneration of the particulate filter 280. An active regeneration is a procedure which provides for the ECU 450 to change some of the operating parameters of the ICE 110 in order to actively increase the temperature of the particulate filter 280 and/or the amount of oxygen supplied into it, with the aim of provoking the combustion of the trapped soot even if the ICE 110 is not in a fuel cut off phase.

In particular, the ECU 450 may be configured to increase the amount of oxygen supplied to the particulate filter 280 by increasing the air-to-fuel ratio of the air and fuel mixture supplied into the engine cylinders 125 (i.e. making the air and fuel mixture leaner) and/or by interrupting the fuel supply in one or more of the engine cylinder 125, so that these cylinders become unfueled and their effect is solely that of pumping fresh air and oxygen towards the particulate filter 280.

However, during any regeneration of the particulate filter 180, the soot combustion has the side effect of rising the particulate filter temperature of a quantity that generally depends on the amount of soot trapped inside of the particulate filter 180, the initial temperature of the particulate filter 180 and finally the amount of oxygen available inside the particulate filter 180. If these parameters are not properly controlled, the particulate filter 180 may be subjected to severe thermal stresses that sometimes can irremediably damage the component and require its replacement.

Referring now to FIG. 3, an algorithm 500 for an active regeneration method for a gasoline particulate filter is provided. At block 502, the method begins with determining if a particulate filter soot load level is greater than a predetermined soot load level threshold. During short driving cycles or driving cycles with low load operations, passive regeneration may not occur because the temperature of the particulate filter is unable to reach the triggering value, or because no fuel cut off phases are performed and the particulate filter may eventually become overloaded.

At block 504, the method continues with determining if the particulate filter's temperature is greater than a predetermined burn off temperature threshold when the particulate filter soot load level is greater than the predetermined soot load level threshold. A particulate filter temperature sensor reads and communicates a temperature signal to a control module. At block 506, if the particulate filter temperature is determined to be greater than the burn off temperature threshold then the method proceeds with initiating soot burning phase actions. These soot burning phase actions include, but not limited to, enabling deceleration fuel cutoff and commanding lean mixture fuel injection when deceleration fuel cut off is inactive.

At block 508, when the particulate filter temperature is determined not to be greater than the burn off temperature threshold then particulate filter heat up phase actions are initiated by the control module which include, but not limited to, retarding spark and/or introducing a inhomogeneous mixture into the particulate filter using injection splitting to increase exhaust gas temperature. Further actions include inhibiting deceleration fuel cut-off and engine auto stop to increase the exhaust temperature, and disabling cylinders to reduce air flow through the particulate filter to reduce cooling effects.

At block 510, the method continues with determining if the particulate regeneration process is complete. If not (due to engine still running), then at block 512, the particulate filter may continue to load with soot and the process repeats. If the engine is off, or the filter temperature is sufficient, then active regeneration processes are stop.

The description of the invention is merely exemplary in nature and variations that do not depart from the gist of the invention are intended to be within the scope of the invention. Such variations are not to be regarded as a departure from the spirit and scope of the invention.

The following is claimed:

1. An active regeneration method for a gasoline particulate filter comprising:
    determining if a particulate filter soot load level is greater than a predetermined soot load level threshold;
    determining if the particulate filter's temperature is greater than a predetermined burn off temperature threshold in response to the particulate filter soot load level being greater than the predetermined soot load level threshold;
    determining a fuel cut-off phase in response to a driver releasing an accelerator pedal;
    initiating deceleration fuel cut-off to cut off fuel in response to the driver releasing the accelerator pedal;
    inhibiting deceleration fuel cut-off to command lean mixture fuel injection and increase exhaust gas temperature in response to the driver releasing the accelerator pedal and the particulate filter's temperature not being greater than the predetermined burn off temperature threshold; and
    initiating soot burning phase actions in response to the particulate filter's temperature being greater than the predetermined burn off temperature threshold and in response to the particulate filter soot load level being greater than the predetermined soot load level threshold.

2. The method of claim 1 wherein the soot dunning phase further comprises enabling deceleration fuel cutoff.

3. The method of claim 1 wherein the soot burning phase further comprises commanding lean mixture fuel injection in response to deceleration fuel cut off being inactive.

4. The method of claim 1 further comprising initiating heat up phase actions in response to the particulate filter's temperature not being greater than the predetermined burn off temperature threshold.

5. The method of claim 4 wherein the heat up phase further comprises retarding spark to increase exhaust gas temperature.

6. The method of claim 4 further inhibiting engine auto stop to increase exhaust gas temperature.

7. The method of claim 4 further comprising disabling cylinders to reduce air flow through the particulate filter.

8. The method of claim 4 wherein the heat up phase further comprises introducing an inhomogeneous mixture, into the particulate filter using injection splitting.

9. The method of claim 8 wherein the inhomogeneous mixture is oxygen and rich exhaust gas.

* * * * *